(12) United States Patent
Ito et al.

(10) Patent No.: US 8,985,284 B2
(45) Date of Patent: Mar. 24, 2015

(54) DISK BRAKE

(75) Inventors: Takahiro Ito, Hitachinaka (JP);
Kenichiro Matsubara, Kasumigaura (JP); Hirotaka Oikawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 189 days.

(21) Appl. No.: 13/253,522

(22) Filed: Oct. 5, 2011

(65) Prior Publication Data

US 2012/0085599 A1    Apr. 12, 2012

(30) Foreign Application Priority Data

Oct. 6, 2010 (JP) ................................. 2010-226853

(51) Int. Cl.
  *F16D 55/22* (2006.01)
  *F16D 65/18* (2006.01)
  *B60T 13/74* (2006.01)
  *B60T 13/58* (2006.01)

(52) U.S. Cl.
  CPC ............ *B60T 13/741* (2013.01); *B60T 13/588* (2013.01)
  USPC ....... 188/72.6; 188/71.8; 188/71.9; 188/72.1; 188/72.2; 303/20; 303/89

(58) Field of Classification Search
  USPC ........ 188/72.6, 71.1, 71.2, 71.8, 158; 303/20, 303/89
  See application file for complete search history.

(56) References Cited

U.S. PATENT DOCUMENTS

| | | | | |
|---|---|---|---|---|
| 7,032,721 | B2 * | 4/2006 | Baumgartner | ............... 188/71.9 |
| 2004/0201270 | A1 * | 10/2004 | Suzuki et al. | ................... 303/20 |
| 2005/0046271 | A1 * | 3/2005 | Suzuki et al. | ................... 303/20 |
| 2005/0077783 | A1 * | 4/2005 | Suzuki et al. | ................... 303/89 |
| 2006/0170282 | A1 | 8/2006 | Yamaguchi et al. | |
| 2008/0011560 | A1 * | 1/2008 | Yamaguchi et al. | .......... 188/158 |
| 2008/0059023 | A1 | 3/2008 | Ueno et al. | |
| 2009/0200976 | A1 * | 8/2009 | Watanabe et al. | ............. 318/432 |
| 2010/0072811 | A1 * | 3/2010 | Kondo et al. | .................... 303/20 |
| 2010/0308645 | A1 * | 12/2010 | Maron et al. | .................... 303/20 |
| 2011/0278105 | A1 | 11/2011 | Maron et al. | |

FOREIGN PATENT DOCUMENTS

| | | |
|---|---|---|
| CN | 101835664 A | 9/2010 |
| CN | 101835665 A | 9/2010 |
| JP | 2002-225701 A | 8/2002 |
| JP | 2006-232263 A | 9/2006 |
| JP | 2010-7818 A | 1/2010 |
| KR | 10-2010-0088686 A | 8/2010 |
| WO | WO 2009/053429 A1 | 4/2009 |

OTHER PUBLICATIONS

Korean Office Action dated Jan. 11, 2013 (six (6) pages).
Chinese Office Action dated Nov. 5, 2013 (six (6) pages).

* cited by examiner

*Primary Examiner* — Anna Momper
*Assistant Examiner* — San Aung
(74) *Attorney, Agent, or Firm* — Crowell & Moring LLP

(57) ABSTRACT

There is provided a disk brake that can hold a required thrust force and maintain a stop state of a vehicle without increasing complexity in the disk brake even if the disk brake is operated in a high temperature state of a brake pad and then a temperature of the brake pad is reduced. In the disk brake 1, an electric motor 8 is driven to thrust a piston 6, the piston 6 presses the brake pad 5 against a disk rotor 2, and the piston 6 is held in the pressed position, the electric motor 8 is re-driven after a predetermined time from a start of holding of the piston 6, and a driving condition of the electric motor 8 after re-driving is determined based on a change in value of a current supplied to the electric motor 8 by the re-driving.

10 Claims, 14 Drawing Sheets

DISK BRAKE

BACKGROUND OF THE INVENTION

1. Field of the Invention

The present invention relates to a disk brake that generates a braking force using an electric motor.

2. Background Art

An example of a background art in the field of the present invention includes a disk brake that generates a braking force using torque of an electric motor. Such a disk brake includes an electric motor in a caliper, and includes a mechanism that converts torque of the electric motor into a linear motion and a braking force holding mechanism. In the disk brake, a piston of the caliper is thrust by energization to the electric motor, and a brake pad is pressed against a disk rotor mounted to wheels (hereinafter referred to as a clamp operation). Thus, a braking force is generated, and this state is held to stop rotation of wheels in parking.

Such a disk brake includes a controller, and controls forward rotation and reverse rotation of the electric motor based on determination according to a switch operation by a driver or a vehicle state to switch a braking state. Usually, the controller observes a current to the electric motor in energization, and when the current reaches a target current value, the controller determines that the piston generates a target thrust force, and stops energization.

However, when a temperature of the brake pad is high, the disk brake is operated with the brake pad being thermally expanded. If a vehicle is left stopped when the target current value is set to a constant value, the brake pad is contracted with reduction in temperature to reduce a thrust force against the disk rotor. There is concern that the thrust force may be reduced to less than a thrust force that allows a parking state to be maintained (hereinafter referred to as a required thrust force).

Thus, in order to ensure durability that allows a large thrust force anticipating a reduction amount to be generated, a caliper is increased in size. Specifically, there is a method of generating a large thrust force at one time so that a required thrust force can be maintained even if a brake pad is contracted, but in that case, strength or the like of a caliper needs to be ensured to generate a larger thrust force, which may disadvantageously increase a size and thus a weight of the caliper.

As a measure against a reduction in thrust force without increasing a size of a caliper, a technique is proposed such that a disk brake includes thrust force detection means, the thrust force detection means is used to monitor a reduction in thrust force, and a clamp operation is performed every time the thrust force reaches a required thrust force (for example, see JP Patent Publication (Kokai) No. 2002-225701).

Also, a technique is proposed such that thrust force detection means detects a thrust force after a clamp operation of a disk brake, a thrust force reduction amount after cooling of a brake pad is estimated from a change in thrust force with time, and it is determined whether another clamp operation is required or not based on the estimation (for example, see JP Patent Publication (Kokai) No. 2006-232263).

However, as in the above-described disk brake, separately providing a force sensor in the disk brake increases complexity or size of a structure of the disk brake, and it is difficult to apply such a technique to the disk brake desired to have a small and simple structure.

SUMMARY OF THE INVENTION

In view of the above-described circumstances, the present invention has an object to provide a disk brake that can maintain a stop state of a vehicle without increasing complexity and size of the disk brake.

In order to achieve the object, for example, configurations described in claims are used. This application includes a plurality of means for achieving the object, and includes, as an example, a disk brake in which a piston is thrust by driving an electric motor, the piston presses a brake pad against a disk rotor, and the piston is held in the pressed position, wherein the electric motor is re-driven after a predetermined time from a start of holding of the piston, and a driving condition of the electric motor is determined based on a change in value of a current supplied to the electric motor in re-driving.

According to the disk brake of the present invention, the electric motor is re-driven after the predetermined time from the start of holding of the piston, and the driving condition of the electric motor is determined based on the change in value of the current supplied to the electric motor in re-driving. Thus, there is no need to separately provide a force sensor or the like that detects a force of the piston, and a stop state of a vehicle can be reliably maintained without increasing complexity of a structure of the disk brake.

DETAILED DESCRIPTION OF THE PREFERRED EMBODIMENTS

Now, embodiments will be described in detail with reference to the drawings.

[Embodiment 1]

Figure 1:
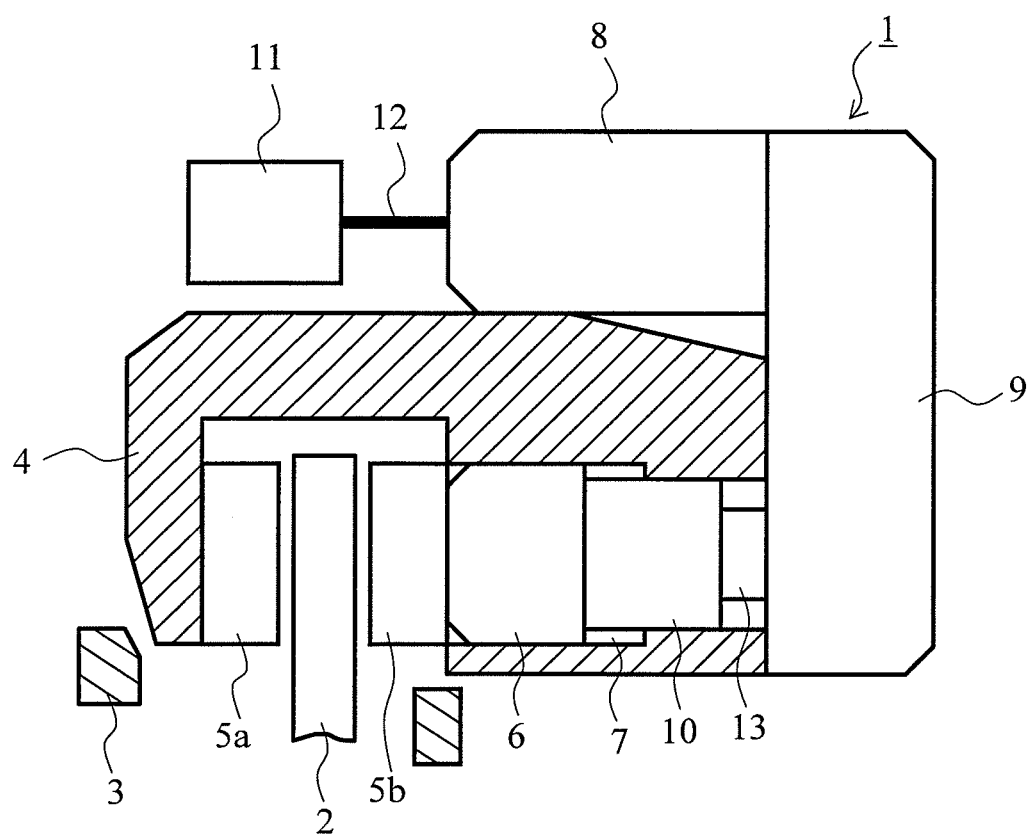
FIG. 1 shows an example of a configuration diagram of a disk brake of the present invention.
Figure 2:
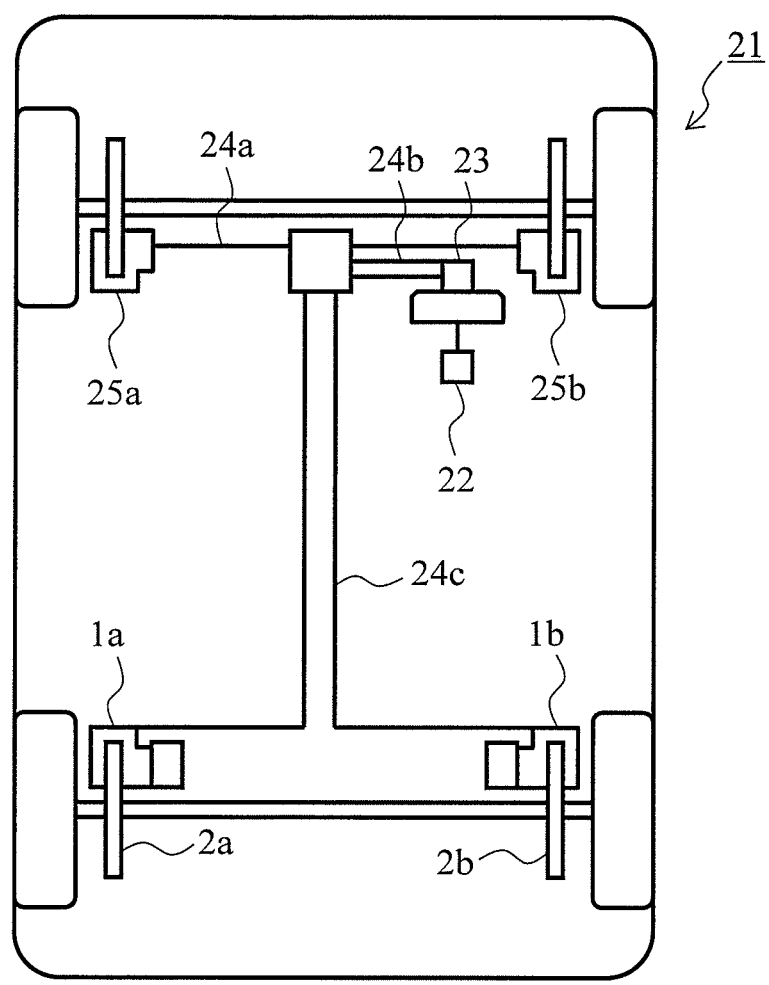
FIG. 2 shows an example of a vehicle including the disk brake of the present invention.

FIG. 1 shows an example of a configuration diagram of a disk brake of Embodiment 1 of the present invention, and FIG. 2 shows an example of a vehicle including the disk brakes 1.

As shown in the example of FIG. 2, disk brakes 1a and 1b (1a and 1b have the same configuration) of the present invention are provided on a rear wheel portion of a vehicle 21. The vehicle 21 includes a brake pedal 22 operated by an operator, a master cylinder 23 that moves a piston therein by an operation of the brake pedal 22 to generate pressure, pipes 24a, 24b and 24c that transmit the pressure, and front wheel disk brakes 25a and 25b (25a and 25b have the same configuration). When the brake pedal 22 is operated in the vehicle having this configuration, the pressure generated in the master cylinder 23 is transmitted via the pipes 24a, 24b and 24c to the front wheel disk brakes 25a and 25b and the disk brakes 1a and 1b on the rear wheels to generate a braking force.

The disk brake 1 (1a and 1b have the same configuration, and thus a and b will be hereinafter omitted) provided on the rear wheels in FIG. 2 includes, as shown in FIG. 1, a carrier 3 secured to a non-rotating portion of the vehicle 21 located on an inner side from the disk rotor 2 of the vehicle 21, a caliper 4 supported floatably in an axial direction of the disk rotor 2, brake pads 5a and 5b placed on opposite sides of the disk rotor 2, and a piston 6 and a pressure chamber 7 in the caliper 4.

The pressure chamber 7 is connected to the pipe 24, and when pressure in the pressure chamber 7 is increased by the operation of the brake pedal 22, the piston 6 is pushed out toward the brake pad 5b, and the brake pads 5a and 5b are pressed against the disk rotor 2. A frictional force generated thereby stops rotation of the disk rotor 2 to obtain a braking force for stopping the vehicle 21. The above is a function of the disk brake 1 as a service brake, which is not herein described in detail. Now, a parking brake function of the disk brake 1 according to the present invention will be described.

The disk brake 1 includes a piston thrust mechanism including an electric motor 8, a reducer 9 connected to an output shaft of the electric motor 8, and a rotation/linear motion conversion mechanism 10 connected to an output shaft of the reducer 9. The electric motor 8 is connected to a controller 11 by a wire 12.

In the disk brake 1 having the above-described configuration, when the electric motor 8 is rotated, torque is transmitted via the reducer 9 to the rotation/linear motion conversion mechanism 10, the rotation/linear motion conversion mechanism 10 pushes out the piston 6, and a clamp operation of pressing the brake pads 5a and 5b against the disk rotor 2 is performed. From a frictional force generated by the series of operations, a braking force to maintain a stop state of the vehicle 21 is obtained. A piston holding mechanism 13 is provided at any point in a transmission path from the electric motor 8 to the rotation/linear motion conversion mechanism 10, and thus after the electric motor 8 is stopped, movement of the piston 6 is stopped to hold the braking force. In FIG. 1, the rotation/linear motion conversion mechanism 10 includes the piston holding mechanism 13. Further, the electric motor 8 is rotated reversely to return the piston 6 to perform a release operation of releasing the braking force.

As such, the disk brake 1 operates the piston 6 by rotation of the electric motor 8, and has the function of the parking brake that allows generation, holding and release of the braking force.

Figure 3:
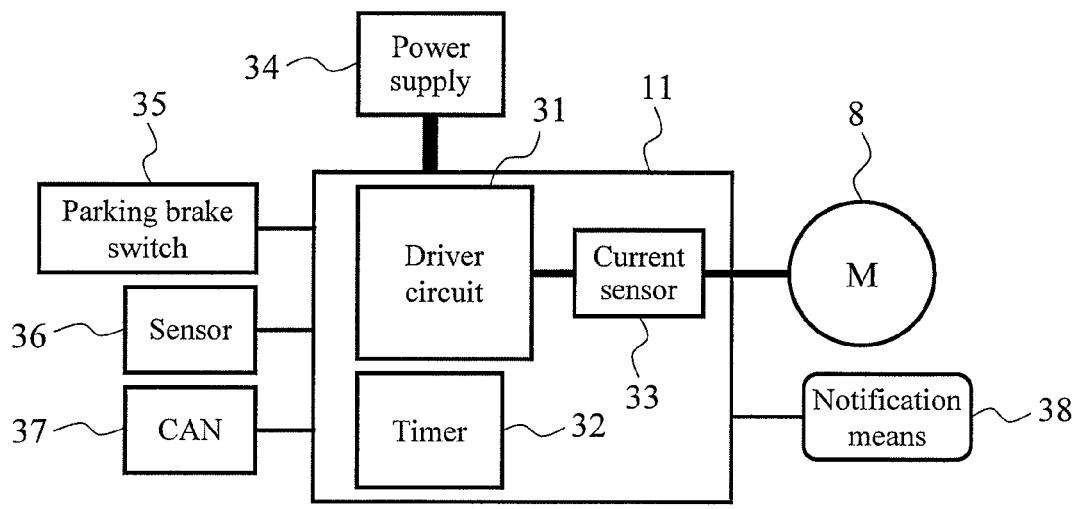
FIG. 3 shows an example of a configuration diagram of a controller of the disk brake of the present invention.

Rotation control of the electric motor 8 is performed by the controller (control means) 11. The controller 11 includes, for example, as shown in FIG. 3, a driver circuit 31 that drives the electric motor 8, a timer 32 for measuring an operation time and the like, and a current sensor 33 that detects a current in driving of the electric motor 8. Also, a power supply 34, a parking brake switch 35 operated by a driver, various sensors 36 for acceleration, vehicle speed, or the like, a CAN 37 connected to other systems of the vehicle 21 for obtaining information on each component of the vehicle, the electric motor 8, and notification means 38 such as a warning light are connected to the controller 11.

The controller 11 performs, for example, a clamp process in which the electric motor 8 is driven to thrust the piston 6, the piston 6 presses the brake pad 5 against the disk rotor 2, and the piston 6 is held in the pressed position, a plurality of times at predetermined time intervals. In a second clamp process and thereafter, a motor driving condition determination process is performed of determining a driving condition of the electric motor 8 based on a change in value of a current supplied to the electric motor 8.

The process in the operation by the controller 11 of the disk brake 1 configured as described above will be described below.

Figure 4:
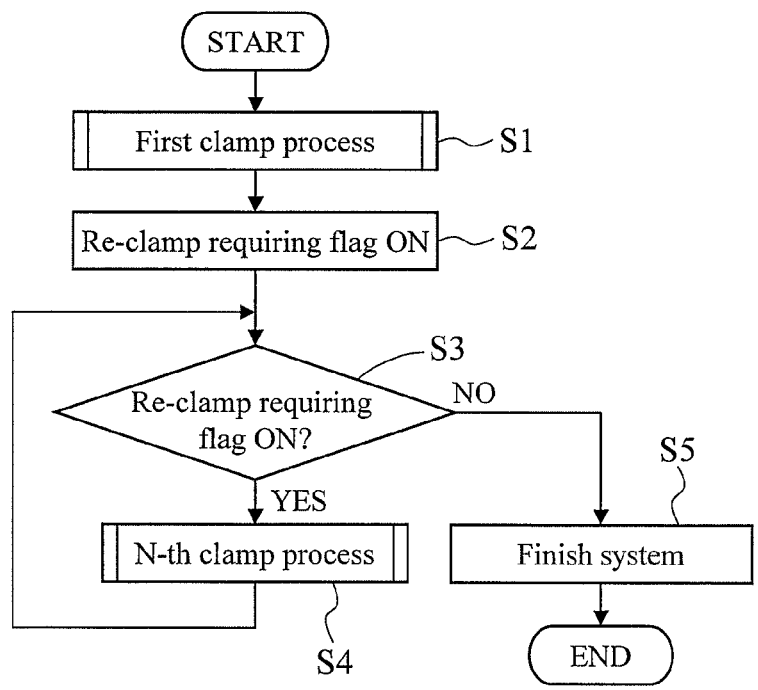
FIG. 4 is an example of a flowchart illustrating a clamp process of the controller of the present invention.
Figure 5:
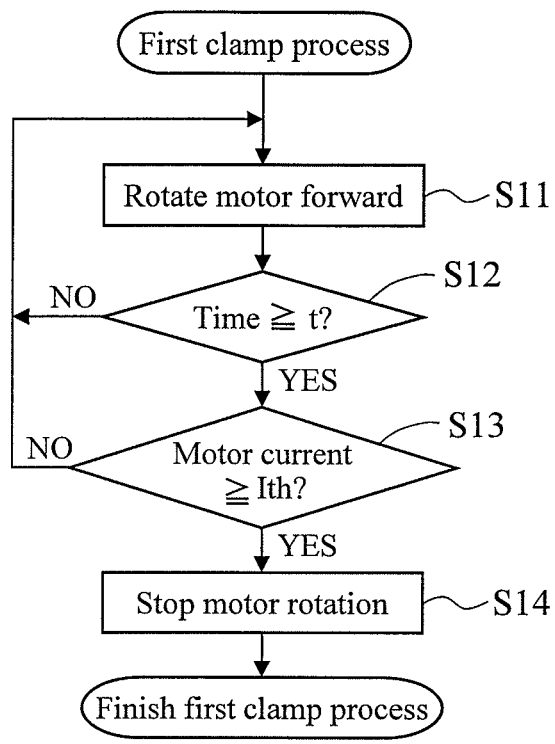
FIG. 5 is an example of a flowchart illustrating a first clamp process performed in Step 51 in FIG. 4.
Figure 6:
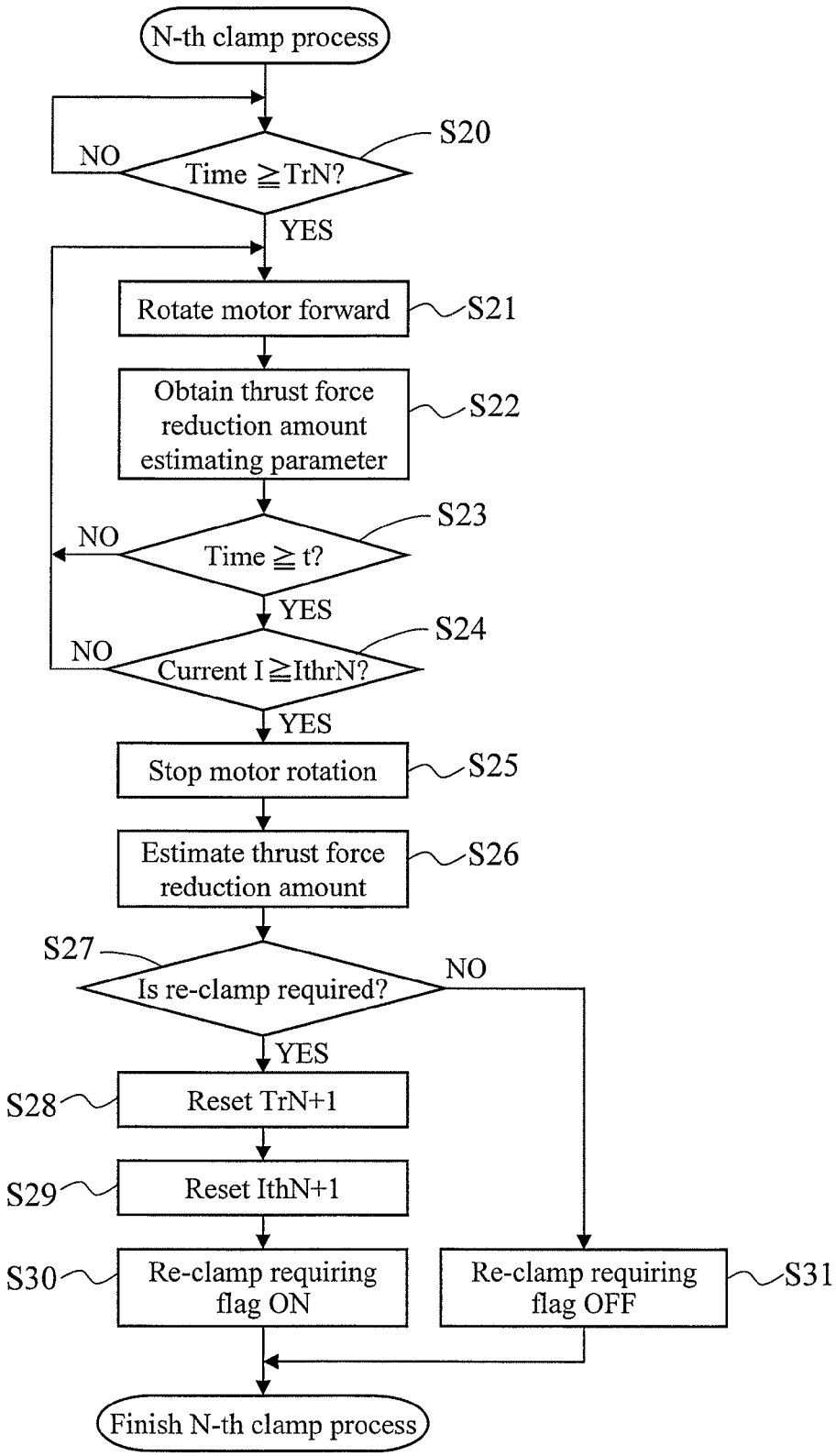
FIG. 6 is an example of a flowchart illustrating a second clamp process or an N-th clamp process thereafter performed in Step S4 in FIG. 4.
Figure 7:
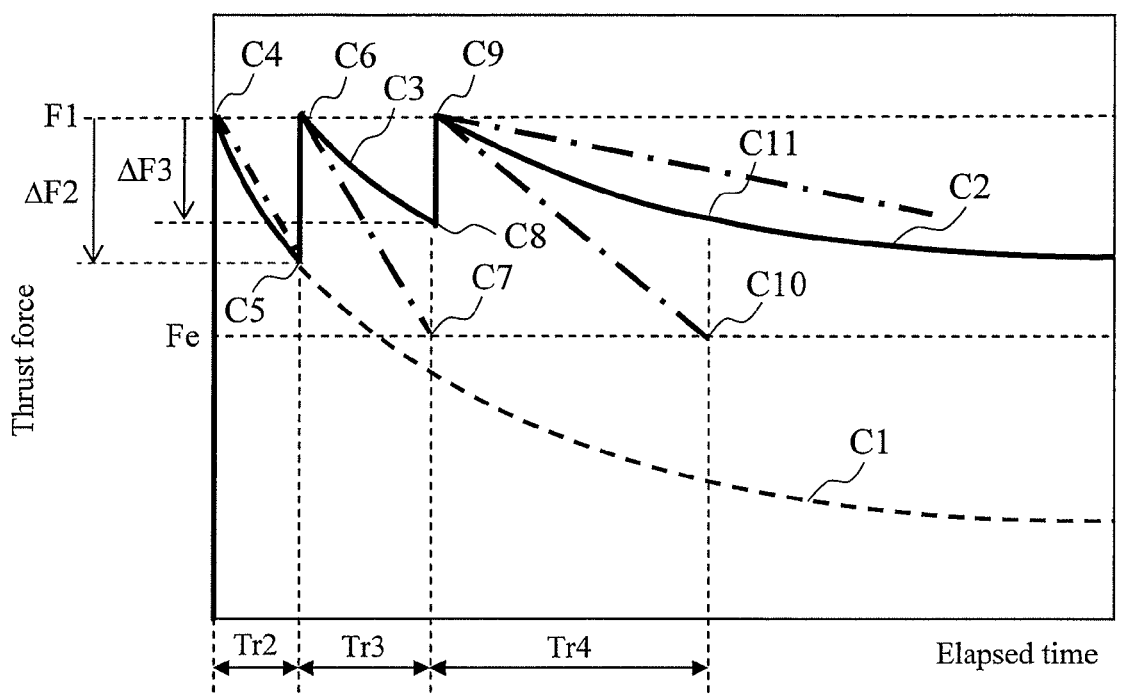
FIG. 7 shows an example of a relationship between a thrust force and an elapsed time when a clamp process is performed in a high temperature state of a brake pad in the present invention.

FIGS. 4, 5 and 6 show examples of flowcharts showing control by the controller 11 when the parking brake switch 35 is operated to a parking brake operation side by the driver, or when the electric motor 8 is operated to generate a braking force by a parking brake based on determination by the controller 11 or a host system, and the clamp process is performed according thereto. Hereinafter, in the flowchart, N refers to a total number of times of the clamp operation. FIG. 7 shows an example of a change with time of a thrust force when a series of clamp operations is performed in a high temperature state of the brake pad 5 using the disk brake 1 to which the present invention is applied. In this description, an example is taken of a case where the vehicle 21 is left in a parking state for a relatively long time.

First, in Step S1, a first clamp process is performed.

Figure 8:
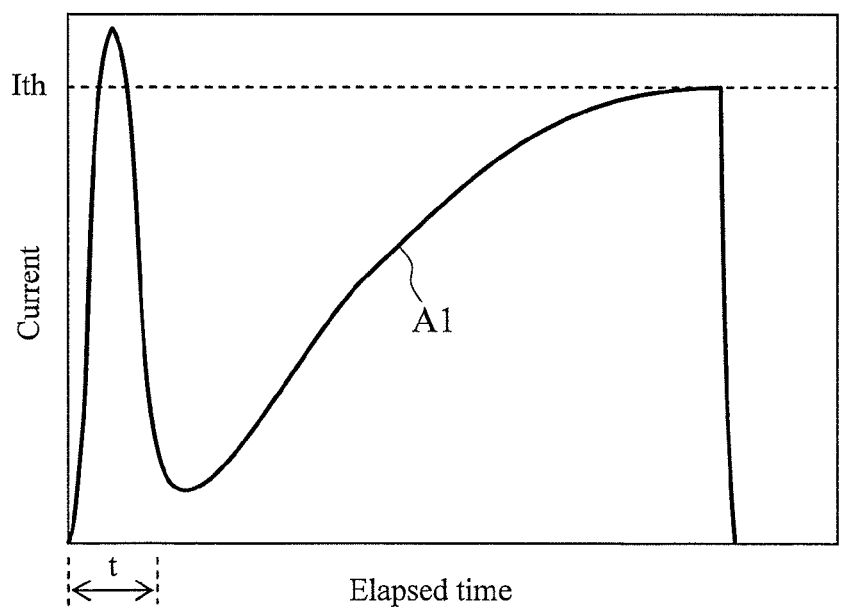
FIG. 8 shows an example of a change with time in current detected by a current sensor when the first clamp process in FIG. 5 is performed.

FIG. 5 shows the first clamp process in Step S1. In the first clamp process, the electric motor 8 is energized by the driver circuit 31 in Step S11 to rotate the electric motor 8 forward. When the electric motor 8 is rotated forward, torque is transmitted to the rotation/linear motion conversion mechanism 10, and the piston 6 presses the brake pad 5 against the disk rotor 2. An example of a current (hereinafter referred to as a current I) detected by the current sensor 33 at this time is shown by a curve A1 in FIG. 8. In FIG. 8, energization to the electric motor 8 is started at a time at a left end.

Then, in Step S13, after a reference time t has passed since the start of energization, the current I is compared with a target current value Ith. When the current I is less than the target current value Ith (I<Ith), the process returns to Step S11, and the electric motor 8 is continuously rotated forward. On the other hand, when the current I is the target current value Ith or more (I≥Ith), the driver circuit 31 is operated to stop energization to the electric motor 8 in Step S14 to stop the electric motor 8.

The target current value Ith is set to, for example, a value equal to or larger than a current Ie at which a required thrust force Fe that is a thrust force of the brake pad 5 is generated and equal to or smaller than a current Imax at which a limit thrust force Fmax that may be generated with strength of the disk brake 1 is generated (Ie≤Ith≤Imax) in order to generate a braking force that prevents the vehicle from moving during a parking brake operation. Thus, after the first clamp process is finished, a thrust force (hereinafter referred to as F1) corresponding to the target current value Ith is generated, and after the stop of the electric motor 8, the piston holding mechanism 13 stops movement of the piston 6 to hold the thrust force.

In this embodiment, for describing a case where a second clamp operation is performed, a re-clamp requiring flag is set to ON in Step S2 in FIG. 4, and it is determined in Step S3 that re-clamp is required since the re-clamp requiring flag is ON, and a second clamp process (re-driving) in Step S4 is performed. Details of an N-th clamp process is shown in a flowchart in FIG. 6 (N corresponds to second, and descriptions will be hereinafter made with N=2).

In the second clamp process, first in Step S20, it waits for a waiting time (predetermined time) Tr2 before a start of the process. The waiting time Tr2 is set to a time equal to or shorter than the shortest time for the thrust force F1 to be reduced to the required thrust force Fe when the clamp operation is performed in the high temperature state of the brake pad 5, and after the thrust force F1 is generated, the brake pad 5 is cooled and contracted with time. The waiting time is calculated, for example, by an experiment or a calculation formula.

Figure 9:
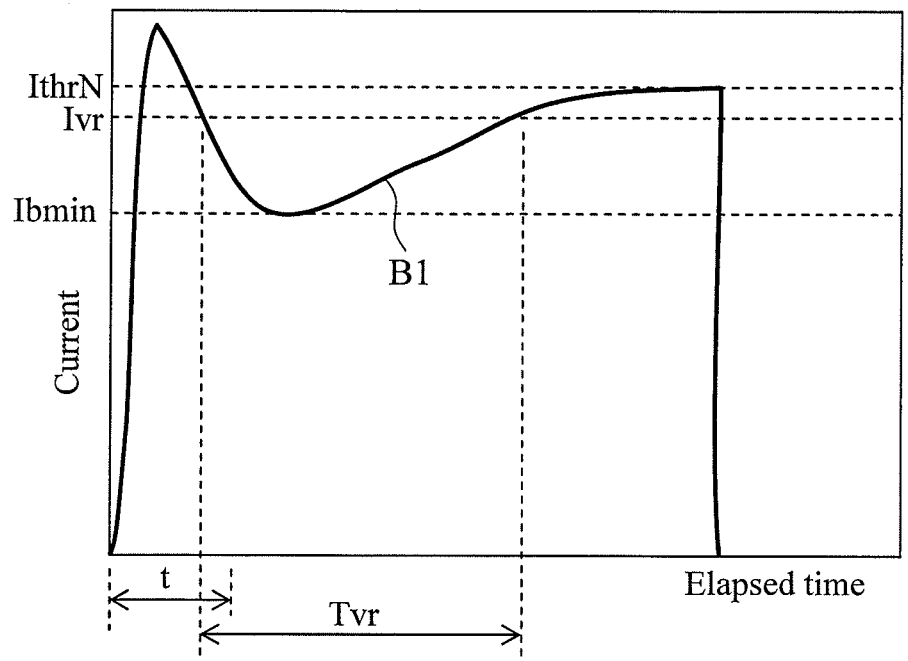
FIG. 9 shows an example of a change with time in current detected by the current sensor when the N-th clamp process in FIG. 6 is performed.

The driver circuit 31 is operated to again energize the electric motor 8, and rotate the electric motor 8 forward in Step S21 (re-drive the electric motor 8). Then, the current sensor 33 detects the current I and a thrust force reduction amount estimating parameter is obtained in Step S22. The thrust force reduction amount estimating parameter refers to, for example as shown in FIG. 9, a characteristic amount of a change in the current I (change in current value) such as a minimum value (minimum current value) Ibmin of the current I after a certain time t has passed since the start of the electric motor during second forward rotation of the electric motor 8, or a time Tvr when the current I is a current Ivr (predetermined value) or less. The driving condition of the electric motor 8 is determined based on the thrust force reduction amount estimating parameter.

Then, as shown in Steps S23, S24 and S25, as in the first clamp process, after the reference time t has passed, the electric motor 8 is continuously rotated forward until the current I reaches a target current value Ithr2 (in the second clamp process, the clamp process is performed with the same setting as in the first clamp process, and thus Ithr2=Ith), and the rotation of the electric motor 8 is stopped after the target current value Ithr2 is reached. By these processes, the thrust force reduced due to cooling and contraction of the brake pad 5 is returned to F1.

Then, the thrust force reduction amount estimating parameter obtained in Step S22 is used to estimate a thrust force reduction amount in Step S26. A method of the thrust force reduction amount estimation performed in Step S26 will be described with reference to FIGS. 7 and 10.

As shown in FIG. 7, while it waits for the waiting time Tr2 in Step S20, the high temperature brake pad 5 is cooled and contracted, and thus the thrust force F1 is reduced along a thrust force reduction curve C1 after finish of the first clamp process, and reduced to a thrust force corresponding to a point C5 immediately before the second clamp process.

Figure 10:
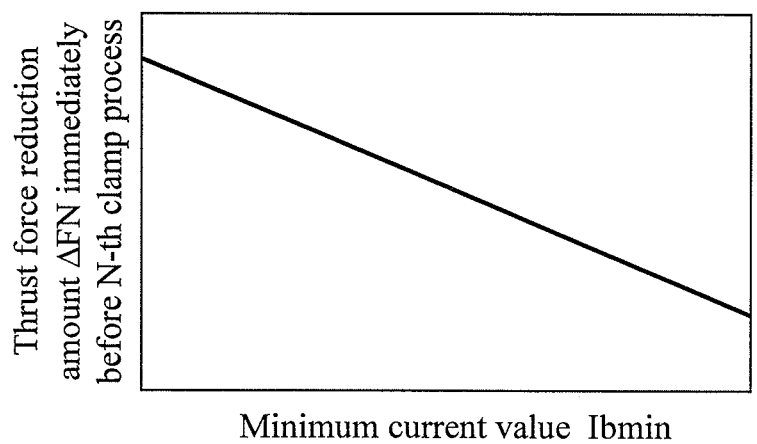
FIG. 10 shows an example of a map showing a relationship between a minimum current value Ibmin and a thrust force reduction amount ΔFN in the N-th clamp process.

For example, when a minimum current value Ibmin is used as the thrust force reduction amount estimating parameter, a thrust force reduction amount ΔFN immediately before N-th clamp is derived from, for example, a map showing a relationship between the thrust force reduction amount ΔFN and the minimum current value Ibmin as shown in FIG. 10. The map is calculated, for example, by experimental data or a calculation formula. For example, if the thrust force is reduced when the electric motor 8 is operated by the same driving method as in the first clamp process, the electric motor 8 can be rotated by a reduction amount of the thrust force. Specifically, FIG. 10 shows that with a large reduction in thrust force, the electric motor 8 can be rotated with smaller torque to reduce the minimum current value Ibmin, while with a small reduction in thrust force, large torque is required to increase the minimum current value Ibmin. From the map in FIG. 10, the thrust force reduction amount ΔF2 immediately before the second clamp in FIG. 7 is calculated in Step S26.

Next, it is determined in Step S27 whether a third clamp process (re-clamp) is required or not. A determination method thereof will be described below. The process in Step S27 corresponds to motor driving condition determination means for determining a driving condition of the electric motor 8.

A linear inclination m2 connecting a point C4 immediately after the first clamp and a point C5 immediately before the second clamp in FIG. 7 is calculated by m2=ΔF2/Tr2.

Figure 11:
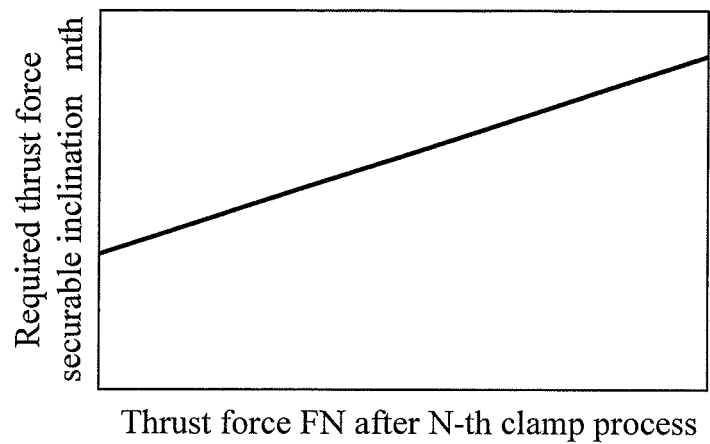
FIG. 11 shows an example of a map showing a relationship between a required thrust force securable inclination mth and a thrust force FN after the N-th clamp process.

When the inclination m2 is equal to or larger than the required thrust force securable inclination mth (m2≥mth), it is determined that the third clamp process is required, and when the inclination m2 is smaller than mth (m2<mth), it is determined that the third clamp process is not required. The required thrust force securable inclination mth is calculated by, for example, a relationship shown in a map in FIG. 11. The map in FIG. 11 shows that when a thrust force FN after the N-th clamp process is large, the required thrust force can be held even after the brake pad is completely cooled and contracted even with a large thrust force reduction amount. The map is created using, for example, a value of a change with time in thrust force reduction of the high temperature brake pad calculated by an experiment, or a value calculated by a calculation formula.

FIG. 7 shows a case where it is determined in Step S26 that the third clamp process is required. In this case, a waiting time Tr3 for control before the third clamp process is decided in Step S28. The waiting time Tr3 is set in such a manner that, for example as shown in FIG. 7, an intersection point C7 of a line passing through the point C6 at the finish of the second clamp process and having the inclination m2 previously calculated and the line of the required thrust force Fe is calculated, and a time between C6 and C7 is the waiting time Tr3. The intersection point C7 is at a point earlier than a time at which the thrust force changing along an actual thrust force reduction curve C3 reaches the thrust force Fe, and thus the thrust force does not reach the required thrust force Fe or less. A shorter time than Tr3 may be set in order to speed up time to finish the clamp process.

Next, when the thrust force is to be changed in the third clamp operation, a target current value Ithr3 is reset in Step S29. For example, by resetting, a small target current value can be set in order to reduce the thrust force generated in the third clamp process when it is determined that the thrust force reduction amount is small in the third clamp process by some means, or in reverse, a large target current value can be set in order to increase a third thrust force when control is to be finished in a third re-clamp process. FIG. 7 shows an example in which the target current value Ithr3 in the third clamp process is Ith.

Then, the re-clamp requiring flag is set to ON in Step S30, the second clamp process is finished, the process returns to Step S3 in FIG. 4, and the third clamp process is performed in Step S4.

In the third clamp process, the same process as the second clamp process is performed up to Step S26 (N in FIG. 6 corresponds to third, and description will be hereinafter made with N=3).

First, in Step S20, process performance is waited for a waiting time Tr3. Then, in Steps S21 to S24, the driver circuit 31 is controlled to rotate the electric motor 8 forward (re-drive the electric motor 8). When the current I detected by the current sensor 33 after the reference time t has passed since the start of rotation reaches the target current value Ithr3 or more, energization to the electric motor 8 is stopped to stop the electric motor 8 in Step S25. Meantime, the thrust force reduction amount estimating parameter is again obtained in Step S22, and is used to perform thrust force reduction amount estimation from after the finish of the second clamp process to the start of the third clamp process in Step S26, and a reduction amount ΔF3 is calculated by the same method as in the second clamp process.

Then, it is determined in Step S27 whether a fourth clamp process is required or not. This determination method also uses an inclination m3=ΔF3/Tr3 of a line passing through points C6 and C7 calculated by the thrust force reduction amount ΔF3 as in the second clamp process, and compares the inclination m3 with the required thrust force securable inclination mth. As shown in FIG. 7, m3<mth, and the thrust force can be reliably the required thrust force Fe or more even after the brake pad 5 is cooled and contracted. Thus, a case where it is determined that the fourth clamp process (re-clamp) is not required will be described. In this case, the process proceeds to next Step S31, the re-clamp requiring flag is set to OFF, and the third clamp process is finished.

Then, the process returns to Step S3, and since the re-clamp requiring flag is OFF, it is determined that the re-clamp process thereafter is not required, energization to the controller 11 of the disk brake 1 is interrupted, and a process of finishing the system is performed in Step S5. In Step S5, a process of stopping supply of power from a power supply device is performed. As such, supply of power is stopped to prevent unnecessary consumption of power due to a long-term activation of the system to prevent a battery from running out.

With such a configuration, in the disk brake 1, when the parking brake function is operated by the electric motor 8 in the high temperature state of the brake pad 5, an appropriate thrust force equal to or larger than the required thrust force is ensured even after the brake pad 5 is cooled and contracted without separately adding a sensor or the like. The braking force of the vehicle 21 is not reduced during parking, thereby preventing gradual movement, so-called slide down, of the vehicle 21 by the inclined ground or the like, and allowing a parking state to be maintained.

Also, the re-clamp operation is performed to eliminate the need to generate an unnecessarily large thrust force, and thus there is no need to increase a size of the caliper to ensure strength and durability of the caliper, thereby reducing the size of the disk brake.

An unnecessary re-clamp process can be omitted, and the number of times of driving of the electric motor can be minimized. This can prevent generation of motor driving noise to ensure silence of a cabin, and also prevent wear of a motor brush, thereby increasing durability of the electric motor.

In the above description, the process along the example of the change in thrust force in application of the present invention shown in FIG. 7 has been described, but the control in Steps S3 and S4 in FIG. 4 is repeatedly performed until the reduced thrust force can hold the required thrust force Fe.

Also, it has been described that the process waiting time Tr2 during moving to the second clamp process is set to the time equal to or shorter than the shortest time for the thrust force F1 to be reduced to the required thrust force Fe when the first clamp operation is performed in the high temperature state of the brake pad 5, and the brake pad 5 is cooled and contracted with time after generation of the thrust force F1. However, learning control may be performed in a production test to set an appropriate value of Tr2 that allows thrust force reduction amount estimation without slide down. This allows thrust force reduction amount estimation to be performed with high accuracy even with product variations and the like of the disk brake 1.

The case where the minimum current value Ibmin in the N-th clamp process (N≠1) is used for the thrust force reduction amount estimation in Step S26 has been described. However, a time in which the current changes without remaining at a constant value, specifically, a time Tvr at a current Ivr or less in FIG. 9, in other words, a time Tvr for a value of the current supplied to the electric motor 8 to reach a predetermined value may be used, and the same advantage can be obtained by using a method of estimating the thrust force reduction amount ΔFN from, for example, a map showing a relationship between the thrust force reduction amount ΔFN and the time Tvr shown in FIG. 12. From the map shown in FIG. 12, if the thrust force is reduced when the electric motor 8 is operated by the same driving method as in the previous clamp process, the electric motor 8 is rotated by a reduction amount of the thrust force. With a large reduction in thrust force, the electric motor 8 is rotated with small torque to increase the time Tvr, while with a small reduction in thrust force, the electric motor 8 is hardly rotated to reduce the time Tvr. The map is created using a value calculated by, for example, experimental data or a calculation formula.

Figure 12:
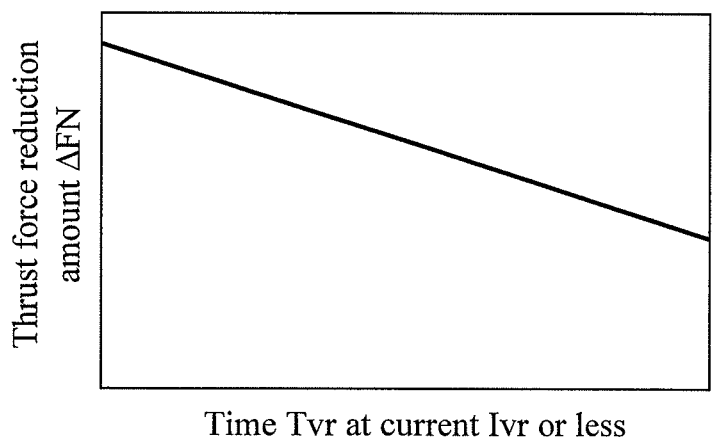
FIG. 12 shows an example of a map showing a relationship between a time Tvr at a current Ivr or less and the thrust force reduction amount ΔFN in the N-th clamp process.
Figure 13:
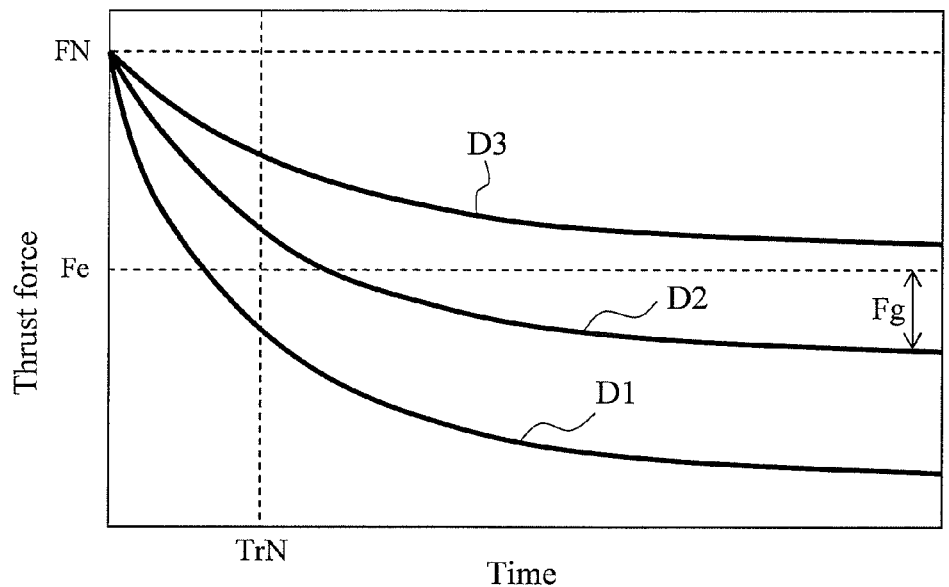
FIG. 13 shows an example of a thrust force reduction amount model.

The same advantage can be obtained if a map showing a thrust force reduction model shown in FIG. 13 is used to determine whether re-clamp is required or not in Step S27. The map is created using, for example, data obtained by measuring a change with time in thrust force of the high temperature brake pad by an experiment, or a value calculated by a calculation formula modeling the change of the thrust force. The map in FIG. 10 or FIG. 12 is used to estimate along which of thrust force reduction models, for example, D1 to D3 in FIG. 13, the thrust force after the finish of the N-th clamp process is reduced from the thrust force reduction amount ΔFN up to the start of the N-th clamp process. When the required thrust force Fe or more can be held after a sufficient time has passed with the estimated model, it is determined that re-clamp is not required.

Figure 14:
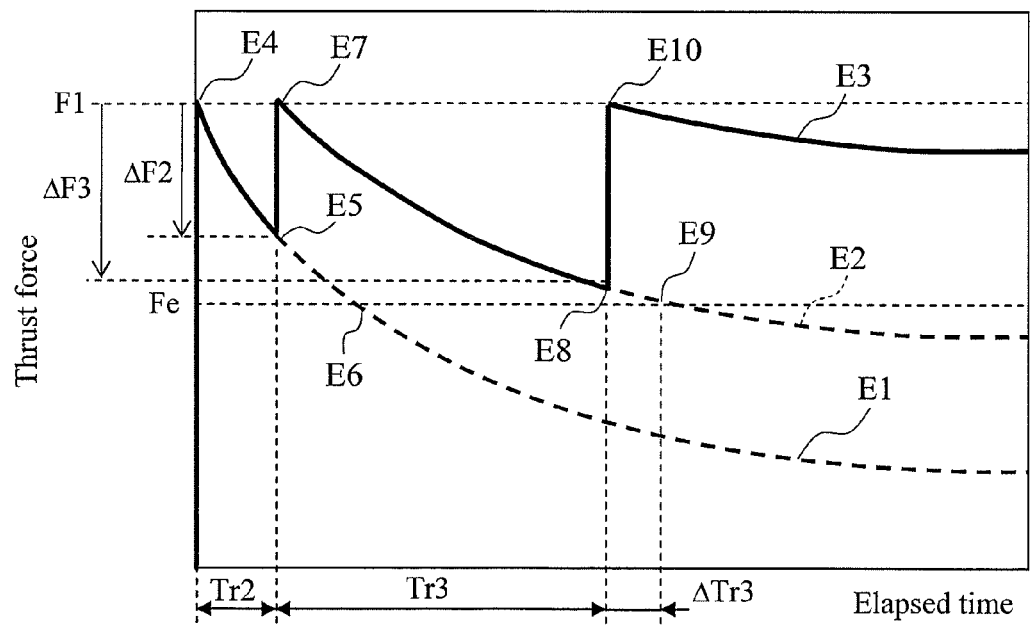
FIG. 14 shows an example of a relationship between a thrust force and an elapsed time when the clamp process is performed in the high temperature state of the brake pad in the present invention.

The same advantage can be obtained by using the thrust force reduction model in FIG. 13 estimated in Step S27 to decide a process waiting time TrN+1 in Step S28. For example, as shown in FIG. 14, with the thrust force reduction model, the thrust force after the second clamp process changes as shown by a curve E2. When an intersection point of the curve E2 and the required thrust force Fe is E9, a time returned by a time ΔTr3 so as to reliably prevent the thrust force from being lower than Fe is set to a waiting time Tr3 before performance of the third clamp process.

The case where the vehicle 21 is left for a relatively long time has been described as an example, and thus the system is finished in Step S5. However, when the vehicle 21 is not in a finish state (ignition switch OFF state), the disk brake may move to a state where only pressing and holding of the brake pad are finished without finishing the system.

[Embodiment 2]

Embodiment 2 of a disk brake 1 of the present invention will be described. In this embodiment, a disk brake 1, a vehicle 21 to which the disk brake 1 is mounted, and a configuration and an operation of the controller 11 are the same and descriptions thereof will be omitted.

Figure 15:
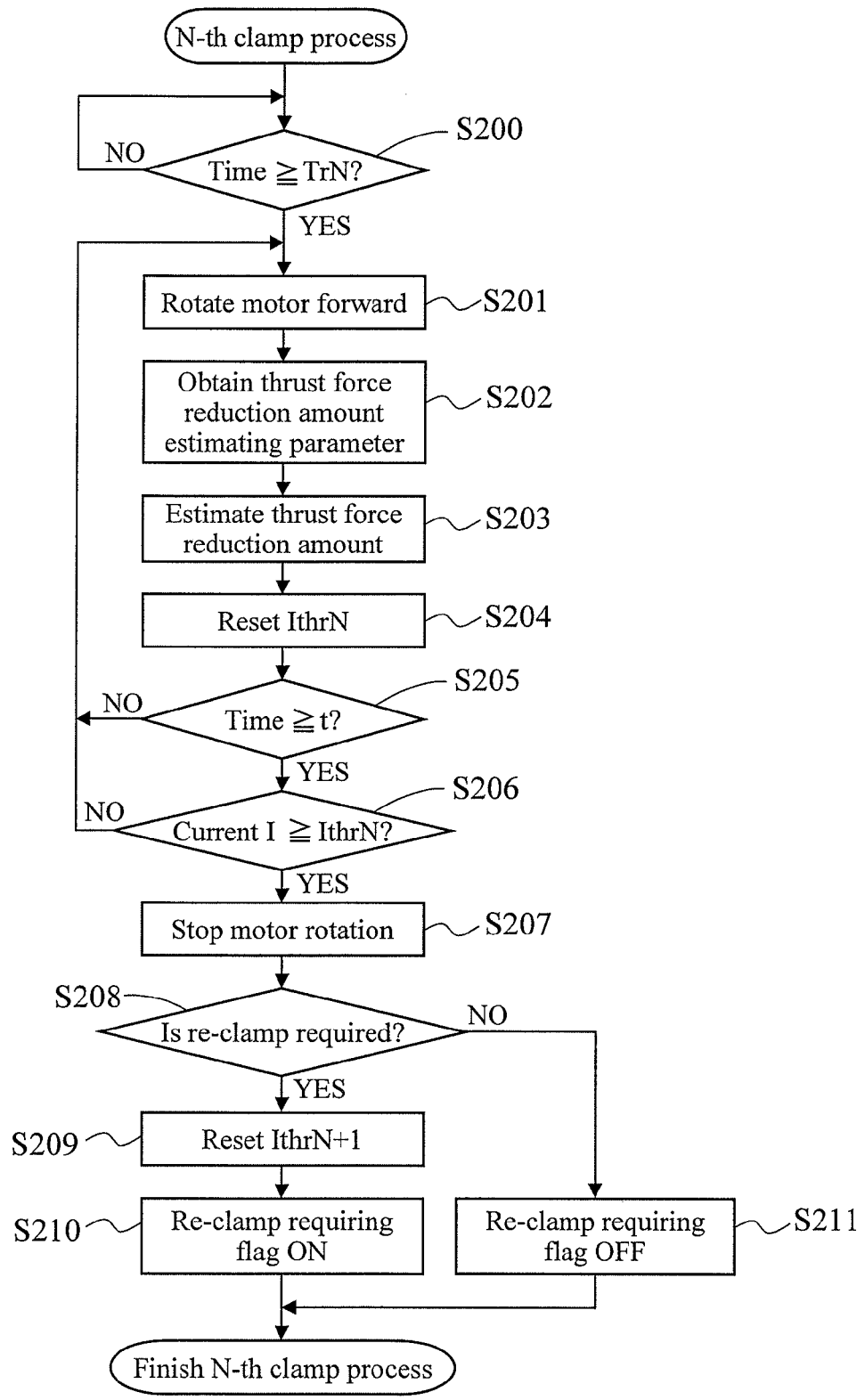
FIG. 15 is an example of a flowchart illustrating the N-th clamp process performed in Step S4 in FIG. 4.
Figure 16:
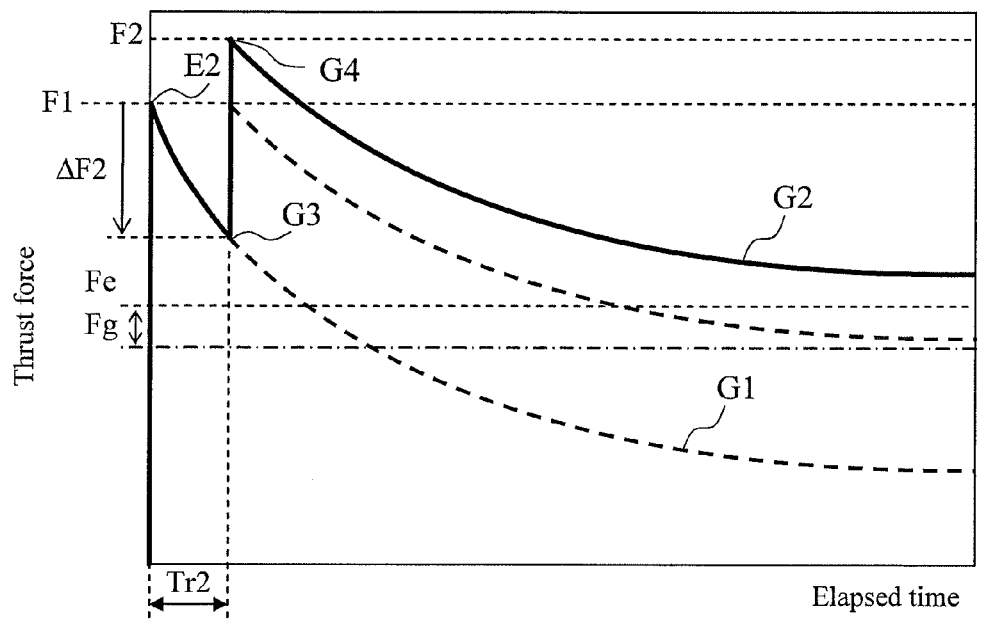
FIG. 16 shows an example of a relationship between a thrust force and an elapsed time when the clamp process is performed in the high temperature state of the brake pad in the present invention.

In this embodiment, in a clamp process shown in FIG. 4, an N-th clamp process corresponding to Step S4 is different from that in Embodiment 1. A flowchart of this process is shown in FIG. 15, and an example of a change in thrust force when an electric motor 8 of the disk brake 1 is driven in the process of this embodiment is shown in FIG. 16. The process is the same as in Embodiment 1 up to Step S4 after finish of a first clamp process, and thus descriptions thereof will be omitted.

When the process moves to the second clamp process in Step 4 in FIG. 4, process performance is waited for a time Tr2 in Step S200 in FIG. 15.

Then, in Step S201, a controller 11 operates a driver circuit 31, energizes the electric motor 8 to rotate the electric motor 8 forward. Then, as in Steps S205 and S206, when the current I of the electric motor 8 detected by the current sensor 33 after a reference time t has passed reaches Ithr2 or more, rotation of the electric motor 8 is stopped in Step S207.

During moving from Step S200 to Step S207, a thrust force reduction amount estimating parameter obtaining process in Step S202, a thrust force reduction amount estimation process in Step S203, and an IthrN resetting process of resetting the target current value Ithr2 in Step S204 are performed.

In Step S202, the same process as in Step S22 is performed, and in Step S203, the same process as in Step S26 is performed, and thus descriptions thereof will be omitted.

The target current value Ithr2 in Step S204 is calculated as described below, for example, using a map of a thrust force reduction model in FIG. 13. The thrust force reduction model is estimated from the thrust force reduction amount ΔF2 estimated in Step S203. For example, a case is considered where the thrust force reduction model is D2, and a thrust force after the second clamp process is F1 as in the first clamp process. In this case, when a sufficient time has passed and the brake pad 5 is cooled and contracted, the thrust force is smaller than a required thrust force Fe by Fg.

Figure 17:
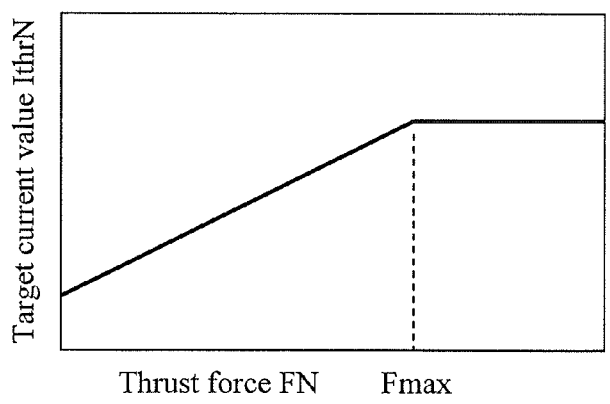
FIG. 17 shows an example of a map showing a relationship between a thrust force FN and a target current value IthrN at finish of the N-th clamp process.

Then, setting of the target current value Ithr2 in the second clamp process is changed, for example, using a map shown in FIG. 17. The map is created using, for example, measurement data obtained by an experiment, or a value calculated by a calculation formula obtained by modeling the disk brake 1. A thrust force with the shortfall Fg of the thrust force added to F1 is set to be a new thrust force FN, and a target current value IthrN is set using the map so that a thrust force after an N-th clamp process is FN. Specifically, in order to increase the thrust force, a value of the target current value IthrN is increased. FN≤Fmax is set, and control is performed so that a thrust force higher than strength of the disk brake 1 is not generated.

Figure 18:
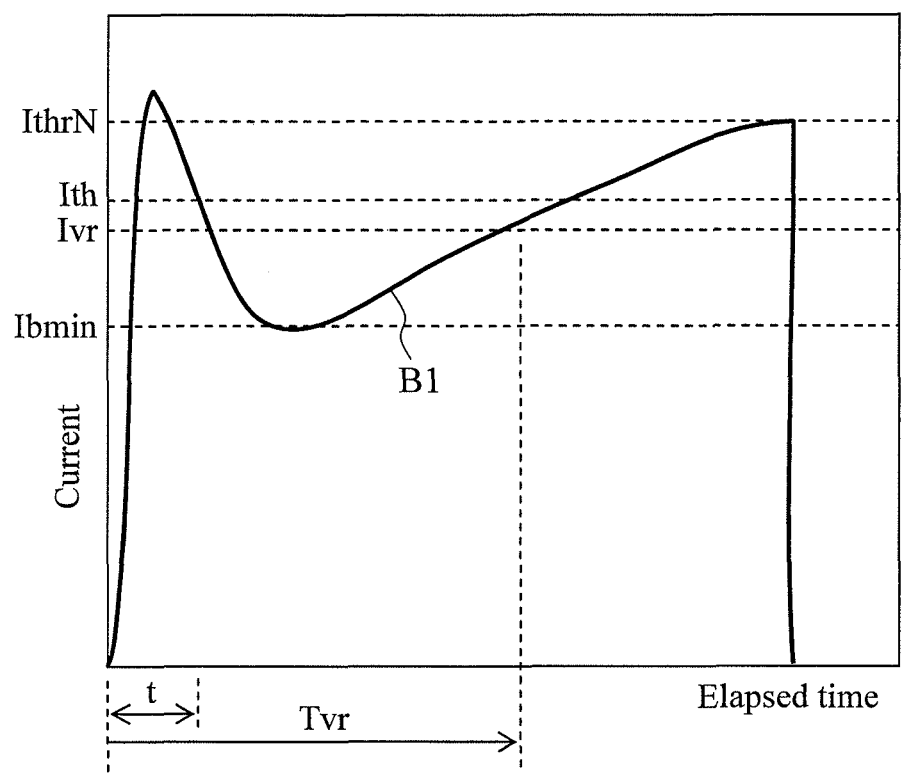
FIG. 18 shows an example of a change with time in current detected by the current sensor when the N-th clamp process in FIG. 15 is performed.

FIG. 18 shows an example of a change in the current I in the second clamp process when the process is performed with the target current value Ithr2 reset in Step S204. Thus, as shown in FIG. 16, a thrust force F2 is obtained at a point G4 after the second clamp process.

Next, as shown in FIG. 16, a case will be described where it is estimated that the thrust force equal to or larger than the required thrust force Fe can be held even after a sufficient time has passed. In this case, in Step S211, a re-clamp requiring flag is set to OFF, and the second clamp process is finished.

Thereafter, as in the process in FIG. 4 of Embodiment 1, energization to the controller 11 of the disk brake 1 is interrupted in Step S5 to finish the system.

When it is determined based on the thrust force reduction model that the required thrust force Fe or more cannot be held after a sufficient time has passed even if a thrust force Fmax is generated by the same method as in Step S27 in Embodiment 1, it is determined in Step S208 that re-clamp is required.

Then, in Step S209, a waiting time TrN+1 before a start of a next clamp process is reset by the same method as in Step S28 in Embodiment 1. Then, the re-clamp requiring flag is set to ON in Step S210, and the N-th clamp process is finished. Then, the process returns to Step S3, and Step S4 is repeated until a required thrust force or more is ensured.

The clamp process of the disk brake 1 is performed with such a configuration, and thus as in Embodiment 1, when the parking brake is operated by the electric motor 8 in a high temperature state of the brake pad 5 of the disk brake 1, an optimum thrust force larger than the required thrust force can be held even after the brake pad 5 is cooled and contracted without separately adding a sensor. Thus, the braking force of the vehicle is not reduced during parking, thereby preventing slide down and allowing a parking state to be maintained. Further, the number of times of operation of the disk brake 1 can be reduced to reduce energy consumption.

In the example in FIG. 16, the required thrust force Fe or more can be ensured in the second clamp process, but when the shortfall Fg of the thrust force is significant and exceeds Fmax, the clamp process may be performed a plurality of times as in Embodiment 1.

In the above description, the change in current in the second clamp process is used to estimate the thrust force reduction amount model, but changes in current when the clamp process is performed three or more times may be used for estimation. This allows more accurate thrust force reduction amount estimation.

In this embodiment, the reduction in the thrust force is estimated using the map of the thrust force reduction model, but the same advantage can be obtained by estimation using a linear approximate model as in FIG. 7 in Embodiment 1.

[Embodiment 3]

Embodiment 3 of a disk brake 1 of the present invention will be described. Also in this embodiment, a disk brake 1, a vehicle 21 to which the disk brake 1 is mounted, and a configuration and an operation of the controller 11 are the same and descriptions thereof will be omitted.

Figure 19:
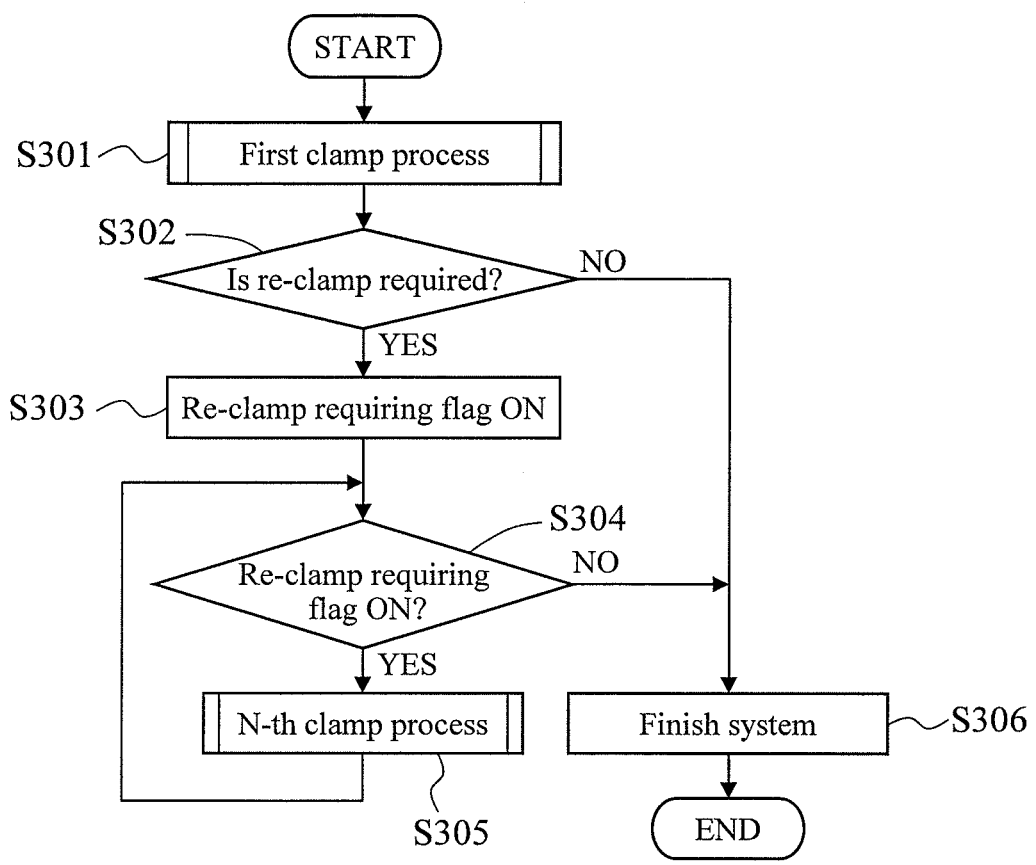
FIG. 19 is an example of a flowchart illustrating the clamp process of the controller in the present invention.

FIG. 19 is a flowchart of a process of a clamp operation of the disk brake 1 of this embodiment. As in Embodiment 1, a case where a vehicle 21 is left in a parking state for a relatively long time will be described as an example.

First, a first clamp process is performed in Step S301. Details of the first clamp process are the same as in FIG. 5 in Embodiment 1, and thus descriptions thereof will be omitted.

Then, it is determined in Step S302 whether a second clamp process is required or not. For the determination, information obtained from various sensors 36 or a CAN 37 is used. For example, when it is determined that the vehicle 21 is parked on a flat place from information from the sensor 36 or an acceleration sensor obtained from the CAN 37, or when it is determined that slide down of the vehicle reliably does not occur even with a reduction in thrust force, it is determined that the second clamp process is not required.

Also when it is determined that a temperature of the brake pad 5 is low from the information from the sensor 36 or the CAN 37, it is determined that the thrust force is not reduced and that the second clamp process is not required. When it is thus determined that the second clamp process is not required, energization to the controller 11 of the disk brake 1 is interrupted in Step S306 to finish the system. This can reduce energy consumption.

In cases other than the above, it is determined that the second clamp process is required, and a re-clamp process in Steps S303 to S305 is performed. The re-clamp process is the same as described in Embodiments 1 and 2, and thus descriptions thereof will be omitted.

The above process is applied to the disk brake 1, and thus the same advantage as in Embodiments 1 and 2 can be obtained, and further, an unnecessary re-clamp process is not performed, thereby reducing energy consumption.

Also in Embodiment 3, as in Embodiment 1, when the vehicle 21 is not in a finish state (ignition switch OFF state), the disk brake may move to a state where only pressing and holding of the brake pad are finished without finishing the system.

Figure 20:
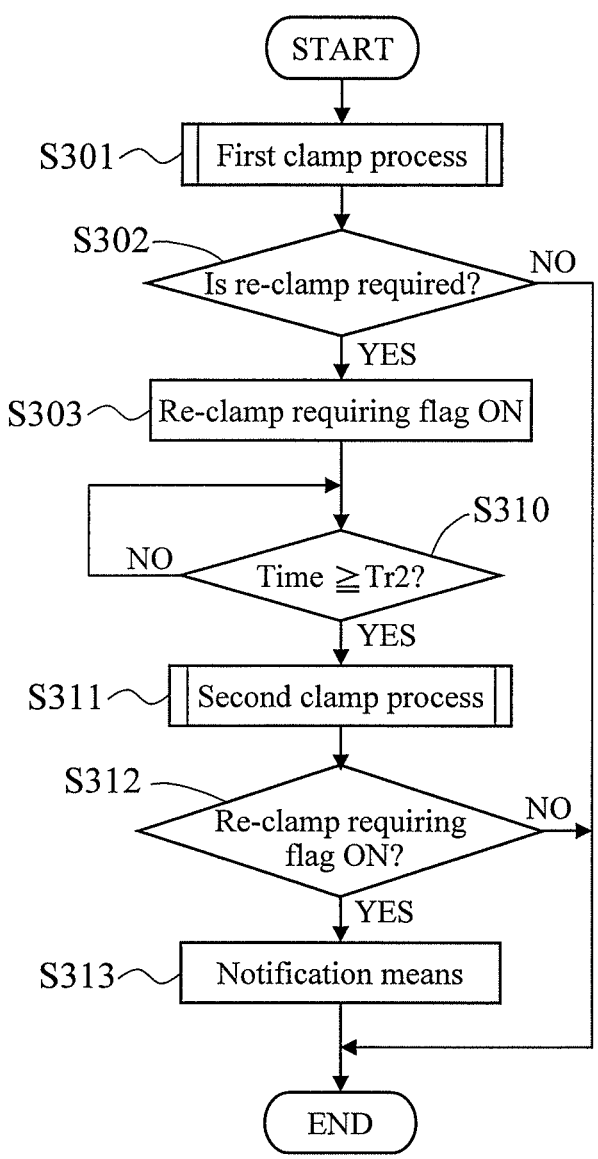
FIG. 20 is an example of a flowchart illustrating the clamp process of the controller in the present invention.

As shown in a flowchart in FIG. 20, when it is determined in Step S312 that the re-clamp requiring flag is ON after the finish of the second clamp process in Step S311, notification means 38 may be turned on in Step S313 to notify a driver of a possibility of slide down in parking. With this configuration, the driver can recognize that re-clamp is required.

The disk brake 1 energizes the electric motor 8 twice or more at predetermined time intervals, and from a change in motor current detected at that time, a change in thrust force of the brake pad 5 against the disk rotor 2 is estimated, and control is performed based on the estimation. Specifically, the brake pad 5 after a temperature reduction is again directly pressed against the disk rotor 2, and the thrust force is estimated based on the motor current. Thus, there is no need to separately provide thrust force detection means such as a force sensor, thereby allowing a stop state of the vehicle to be reliably maintained without increasing complexity of a structure of the disk brake.

The present invention is not limited to the above described embodiments, but various changes or combinations may be made without departing from the gist of the present invention.

DESCRIPTION OF SYMBOLS 1 disk brake
2 disk rotor
3 carrier
4 caliper
5 brake pad
6 piston
7 pressure chamber
8 electric motor
9 reducer
10 rotation/linear motion conversion mechanism
11 controller (control means)
12 wire
13 piston holding mechanism
21 vehicle
22 brake pedal
23 master cylinder
24 pipe
25 front wheel disk brake
31 driver circuit
32 timer
33 current sensor
34 power supply
35 parking brake switch
36 sensor
37 CAN
38 notification means

What is claimed is:

1. A disk brake comprising:
a caliper in which a piston presses a brake pad placed to face a disk rotor;
a piston thrust mechanism that is provided in the caliper and thrusts the piston with an electric motor;
a piston holding mechanism that holds the piston in a position thrust by the piston thrust mechanism; and
control means that drives the electric motor, the control means including motor driving condition determination means that in a second clamping process, which begins after a given amount of time has elapsed since and end of a first clamping process, re-drives the electric motor after a predetermined time from a start of holding of the piston by the piston holding mechanism, and determines a driving condition of the electric motor for a third or subsequent clamping process, based on a change in value of a current supplied to the electric motor, which change in value is measured beginning with the re-driving associated with the second clamping process, wherein
a determination to stop motor rotation, and thereby finish the first clamping process, is made based on a measured current value, and
at least one of the second and third or subsequent clamping process is performed while the brake pad is clamped.

2. The disk brake according to claim 1, wherein the motor driving condition determination means determines a driving condition of the electric motor based on a time for a value of the current supplied to the electric motor to reach a predetermined value, or a value of the current supplied to the electric motor after a preset reference time has passed as the change in the current value.

3. The disk brake according to claim 1, wherein the motor driving condition determination means determines a driving condition of the electric motor based on a minimum current value when the electric motor is re-driven as the change in the current value.

4. The disk brake according to claim 1, wherein the motor driving condition determination means changes a setting of a target current value of the electric motor based on the change in the current value.

5. The disk brake according to claim 1, wherein the motor driving condition determination means changes a setting of the target current value of the electric motor to a value larger than a predetermined target current value based on the change in the current value.

6. The disk brake according to claim 4, wherein the motor driving condition determination means changes the setting of the target current value of the electric motor to a value larger than a predetermined target current value with increasing time for the value of the current supplied to the electric motor to reach the predetermined value, or with decreasing minimum value of the current supplied to the motor after the reference time has passed.

7. The disk brake according to claim 4, wherein the control means stops supply of electric power from a power supply device after the value of the current supplied to the electric motor reaches the target current value, and the supply of the current to the electric motor is stopped.

8. The disk brake according to claim 1, wherein the motor driving condition determination means stops the supply of the electric power from the power supply device based on the change in the current value.

9. The disk brake according to claim 1, wherein the predetermined time is a time equal to or shorter than a shortest time for a thrust force of the piston to be reduced to a preset required thrust force from the start of holding of the piston by the piston holding mechanism.

10. The disk brake according to claim 1, wherein the change in value of the current is determined based on a comparison between a current applied to the electric motor during a first operation and a current applied to the electric motor during a second operation.

* * * * *